March 9, 1954 W. W. McLEAN 2,671,696
SILO UNLOADING DEVICE
Filed May 24, 1950 5 Sheets-Sheet 2
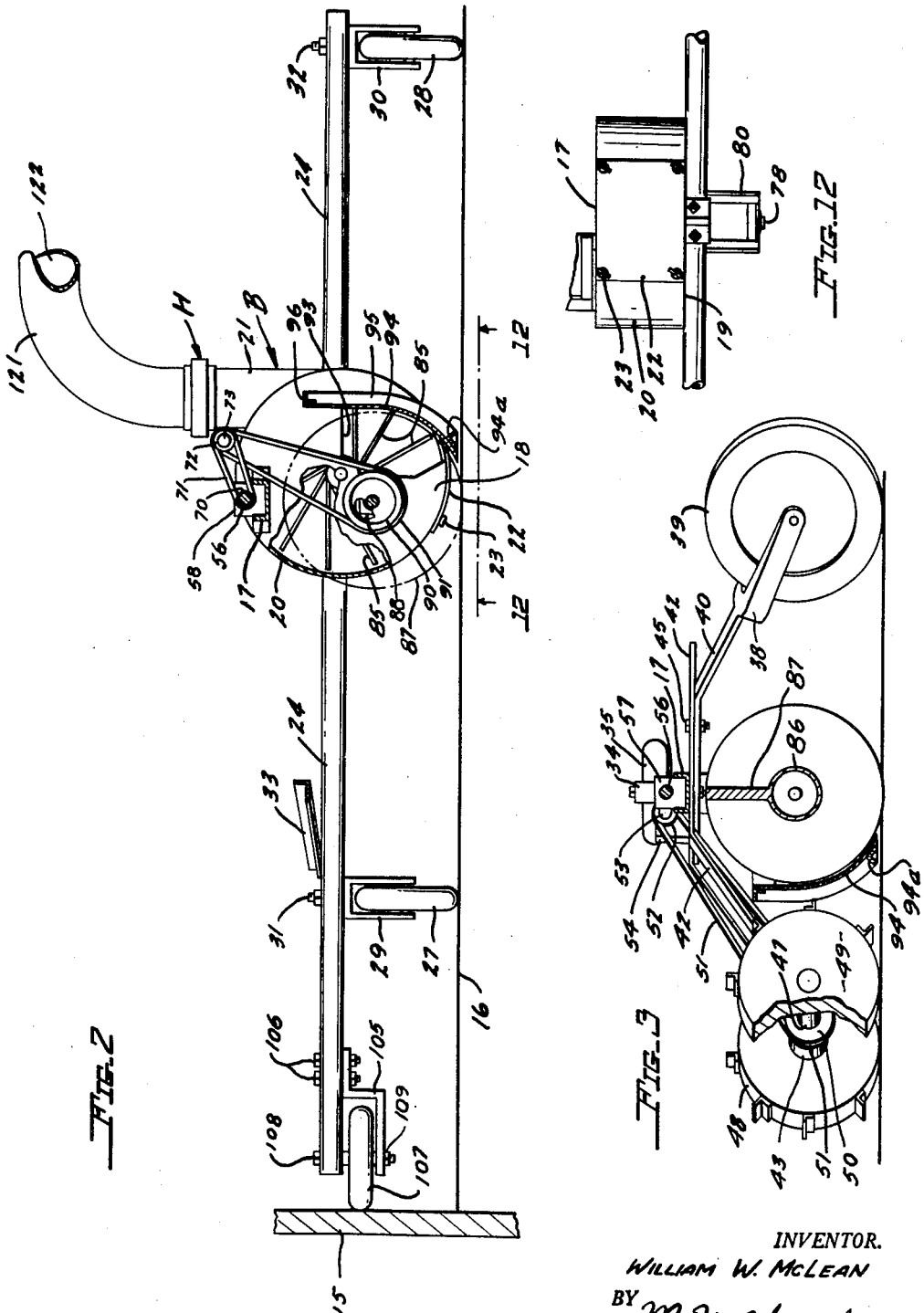
INVENTOR.
WILLIAM W. McLEAN
BY M. Y. Charles
ATTORNEY.

March 9, 1954     W. W. McLEAN     2,671,696
SILO UNLOADING DEVICE
Filed May 24, 1950                 5 Sheets-Sheet 3
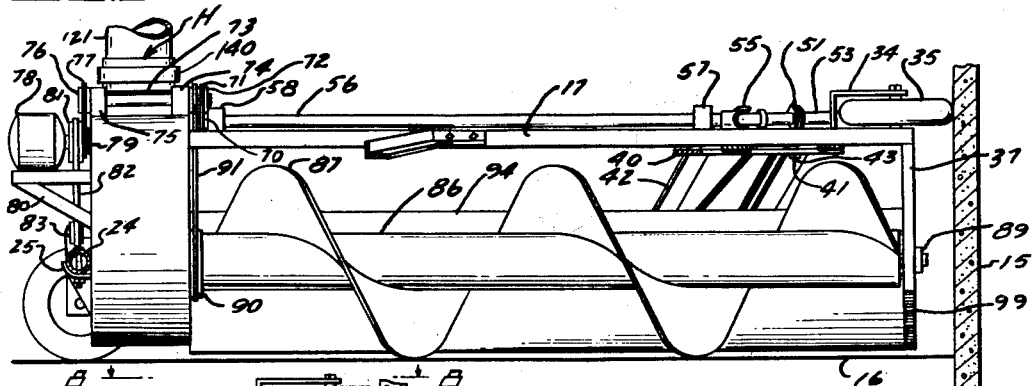
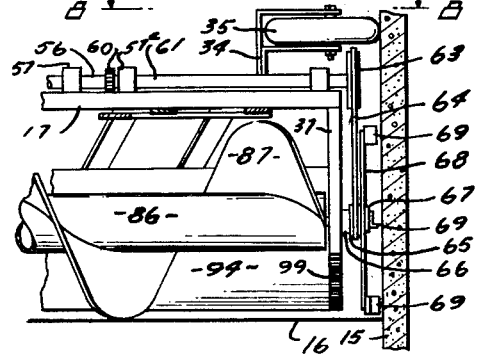
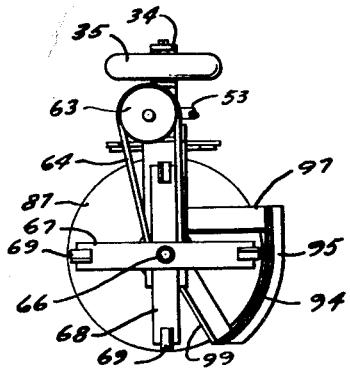
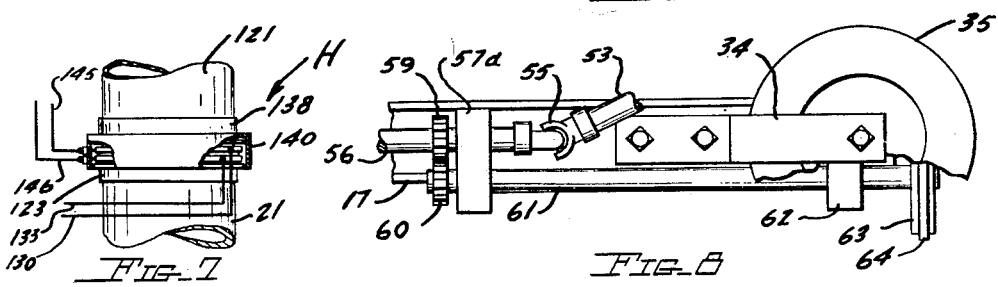
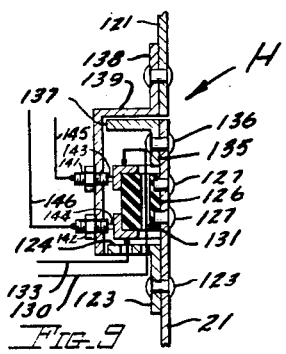
INVENTOR.
WILLIAM W. McLEAN
BY M. Y. Charles
ATTORNEY.

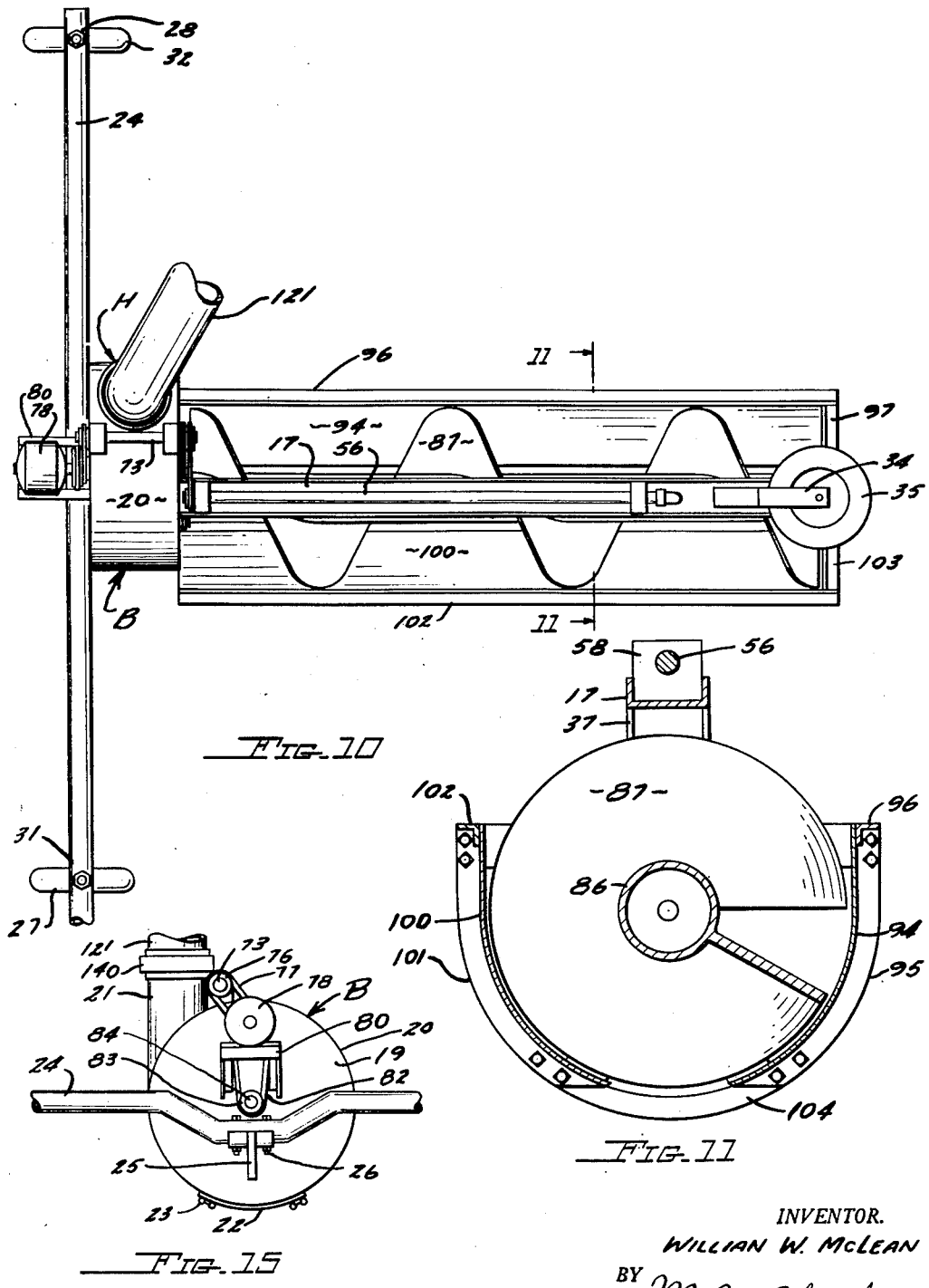

Patented Mar. 9, 1954

2,671,696

UNITED STATES PATENT OFFICE 2,671,696

SILO UNLOADING DEVICE

William W. McLean, Lewis, Kans.

Application May 24, 1950, Serial No. 163,943

3 Claims. (Cl. 302—56)

My invention relates to an improvement in devices for unloading silos. An object of my invention is to provide a silo unloading device that will cut or remove uniform thickness slices or layers of silage from the top of the silage in the silo and deliver the cut of silage outside of the silo for use.

Another object of the invention is to provide a device of the kind mentioned that will be supported on top of the silage in the silo and will travel around the inside of the silo as it cuts and removes the layer of silage from the silo.

A further object of the invention is to provide a device of the kind mentioned that is self centering and leveling in the silo so that as it operates the ensilage in the silo will be uniformly cut and removed so that the top of the silage in the silo will always be flat and level.

A still further object of the invention is to provide a device of the kind mentioned that is simple in construction and comparatively light in weight, one that is inexpensive to buy and operate as well as one that is sturdy in construction and is long lived.

A still further object of the invention is to provide a device of the kind mentioned which, when its work is done and the machine is stopped, will automatically clean itself and therefore will not be logged up and will be ready for use the next time it is to be used.

A still further object of the invention is to provide a device of the kind mentioned that can be converted for use in handling silage or similar movable material from the ground into truck bodies, bins, storage tanks and the like. These and other objects of the invention will be more fully explained as this description progresses.

Now referring to the accompanying drawings in which similar numerals of reference designate the same parts throughout the several figures of the drawings:

Fig. 2 is a cross sectional view through the device, the view being as seen from the line 2—2 in Fig. 1, and looking in the direction of the arrows.

Fig. 3 is a cross sectional view through the device, the view being as seen from the line 3—3 in Fig. 1, and looking in the direction of the arrows.

Fig. 4 is a side and partial sectional view of the device, the view being as seen from below the blower and screw.

Fig. 5 is an enlarged detail side view of the end of the device that is positioned next to the wall of the silo.

Fig. 6 is a view of the right hand end of the portion of the device shown in Fig. 5.

Fig. 7 is an enlarged detail side view of the swivel joint and electrical conductor means therein that connects the stationary conductor tube to the discharge tube of the lower portion which turns beneath the stationary tube as the device travels in a circular movement in the silo.

Fig. 8 is a detail top plan view of the split power drive, one for the traction wheels, and the other for the silage moving element that runs immediately adjacent the silo wall.

Fig. 9 is an enlarged vertical sectional view through the electrical power transmission rings and associated parts for transmitting the electric current from the stationary part thereof to the electric motor that drives the machine in its circular movement above mentioned.

Fig. 10 is a top plan view of the cutter and conveyor auger and blower device, parts of which are broken away to illustrate the adjustment means for the spacer wheel that spaces the end of the machine the desired distance away from the silo wall as the machine operates.

Fig. 11 is a sectional view through the auger portion of the machine, the view being as seen from the line XI—XI in Fig. 10, and looking in the direction of the arrows.

Fig. 12 is a bottom plan view of the blower housing, the view being as seen from the line XII—XII in Fig. 2, and looking in the direction of the arrows.

Fig. 15 is a left hand end view of the unloading device as shown in Fig. 4.

Figure 1:
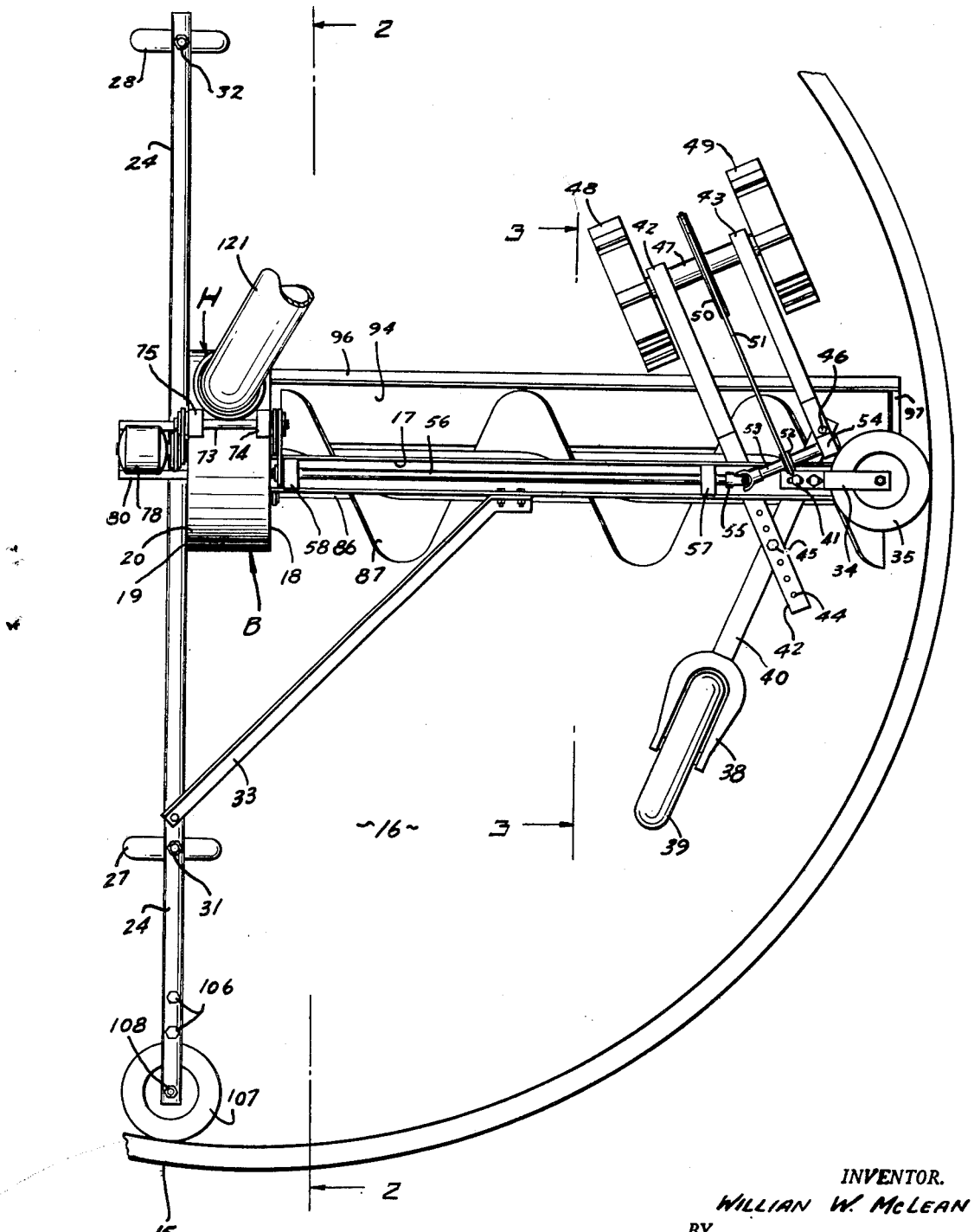
Fig. 1 is a top plan view of the silo unloading device, the device being positioned within a silo.

In the drawings is shown a circular silo wall 15, and the silo unloading device is positioned within the silo, on top of the silage 16.

The silo unloading device is shown as having a horizontal channel frame element 17, one end of which is rigidly attached to, and is supported by the rigid side wall 18 of a blower housing B which has a corresponding side wall 19 that is spaced away from the wall 18, the two walls 18 and 19 being joined by a curved wall 20 to form the composite blower housing B. The blower housing B is provided with an upwardly directed discharge tube connection 21, the lower end of which is rigidly attached to the curved blower wall 20 and opens into the blower housing 18—19—20.

The lower portion of the curved blower housing wall 20 has an opening therethrough that is of several inches in length and reaches from the side wall 18 to the side wall 19 of the housing B and is closed by a closure plate 22 that is removably held in place by a plurality of screws 23 that are passed through the closure plate 22 and are threaded into the end portions of the curved blower wall 20.

The blower housing B is partially supported by a long pipe support member 24 that is seated in a bracket 25 that is an integral part of the side wall 19 of the blower B, and the pipe 24 is rigidly held in place in the bracket 25 by means of bolts 26 that are passed through the pipe 24 and bracket 25, the bolts 26 having nuts threaded thereon to make the assembly solid.

The support pipe 24 is carried by wheels 27 and 28 that are revolvably mounted, one in each of the fork elements 29 and 30 that are swivelly mounted at the points 31 and 32 in the end portions of the support pipe 24. The device is provided with a brace member 33, one end of which is bolted or rigidly attached to the support pipe 24, and the other end of which is bolted or rigidly attached to the channel iron frame member 17 to stabilize or make more rigid the support pipe 24.

The outer end of the channel frame member 17 is provided with a thrust wheel bracket element 34 that is longitudinally adjustable on the channel frame element 17, and on which is revolvably carried a thrust wheel 35 for purposes that will later be described.

Figure 13:
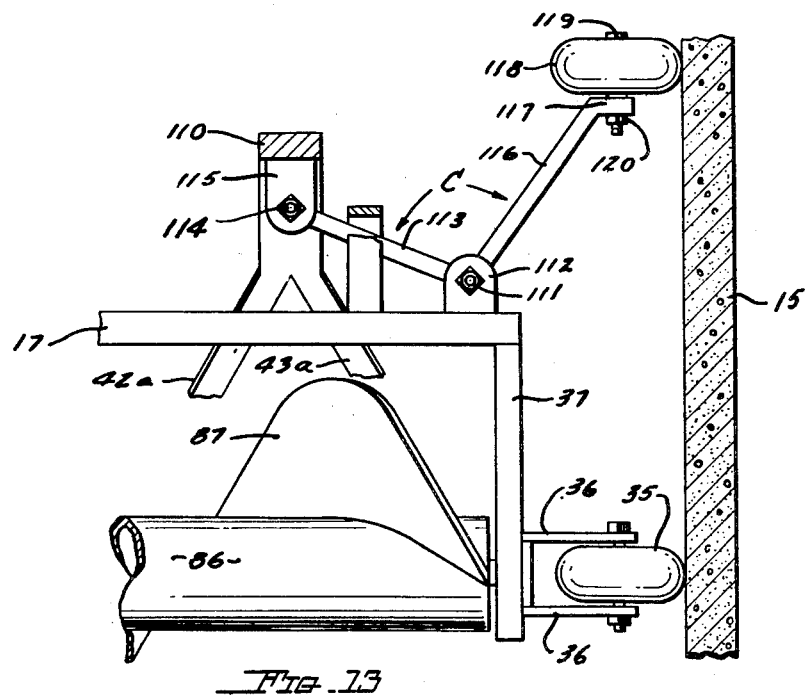
Fig. 13 is a detail side view of the end portion of the machine that is positioned immediately adjacent the wall of the silo, and illustrating a leveling device for the machine.

There are instances such as will later be made obvious where it would be necessary or advantageous to position the thrust wheel below the channel frame element 17 as shown in Fig. 13, in which case the thrust wheel 35 is revolvably carried in a fork element 36 that is rigidly attached to a vertically positioned frame member 37 the upper end of which is rigidly attached to the outer end portion of the channel iron frame member 17 and depends therefrom.

The outer end of the channel frame element is supported on an adjustable frame work carried by wheels as will later be fully described. The frame work just mentioned consists of a fork element 38 in which is revolvably carried a supporting wheel 39 therefor. One end of a supporting frame bar 40 is rigidly attached thereto, preferably integrally formed thereon, and the bar 40 slopes upwardly and then turns to a horizontal position and then extends under and past the channel frame element 17 and rigidly attached thereto by means of a bolt 41 that passes through the channel 17 and the bar 40, the bolt 41 having a nut threaded thereon to rigidly bind and hold the bar 40 against the channel 17. The bolt 41 also serves as a part of the means for holding the thrust wheel bracket 34 on the channel 17. The adjustable frame work further includes a pair of parallel supporting bars 42 and 43, the upper end of the bar 42 is bent into a horizontal position and passes under and past the channel frame member 17 and the horizontal portion of the bar 40. The projecting end portion of the bar 42 has a series of spaced apart holes 44 therein and any one of which may be used to receive a bolt 45 that is also carried in the central portion of the bar 40. The free end of the bar 40 is bolted at the point 46 to the free end of the bar 43. The bar 42 is also bolted, not shown, to the channel frame member 17.

Revolvably mounted in the outer ends of the pair of bars 42 and 43 is an axle element 47 on the outer ends of which is rigidly mounted a pair of traction wheels 48 and 49.

Rigidly mounted on the axle element 47 is either a sprocket wheel or a V-belt pulley 50 around which is passed and is drivably engaged by either a chain or a V-belt 51 that also passes around and engages a small sprocket wheel or V-belt pulley 52 that is rigidly mounted on a sub-drive shaft 53, one end of which is revolvably carried in a bearing element 54 that is rigidly carried on the inner end portion of the bar 43. The other end of the sub-drive shaft 53 is rigidly carried in one half of a universal joint 55, the other half of the universal joint 55 being rigidly mounted on one end of the drive shaft 56 that is revolvably carried in bearings 57 and 58 that are rigidly mounted on the channel iron frame element 17.

Rigidly mounted on the drive shaft 56 is a drive gear 59 that is in mesh with a driven gear 60 that is rigidly mounted on one end of a second sub-drive shaft 61 that is revolvably carried in bearings 57a and 62. On the outer end of the sub-drive shaft 61 is rigidly mounted either a sprocket wheel or a V-belt pulley 63 around which passes and is engaged by either a drive chain or V-belt 64 that also passes around and engages a driven sprocket or V-belt pulley 65 that is revolvably mounted on a support pin 66 therefor that is rigidly mounted on the vertical frame element 37, and cross arms 67 and 68 are rigidly carried by the driven sprocket or V-belt pulley 65. The outer ends of the cross arms 67 and 68 have outwardly projecting lugs 69 thereon for purposes that will later be made obvious.

The rear end of the shaft 56 either has a sprocket wheel or a V-belt pulley 70 that is rigidly mounted thereon, and a chain or V-belt 71 passes therearound and engages the sprocket or V-belt pulley 70 for driving purposes. The chain or V-belt 71 also passes around and engages a second sprocket or V-belt pulley 72 that is rigidly mounted on one end of a jack shaft 73 that is revolvably mounted in bearing elements 74 and 75 that are rigidly mounted one on either side of the top of the curved blower housing wall 20. The other end of the jack shaft 73 is provided with another sprocket wheel or V-belt pulley 76. Another chain or V-belt 77 passes around and engages the sprocket wheel or V-belt pulley 76.

The machine is provided with an electric motor 78 for powering the machine. The drive shaft of the motor 78 has a sprocket wheel or a V-belt pulley 79 rigidly mounted thereon and the chain or V-belt 77 passes therearound and engages the sprocket or V-belt pulley 79 for driving purposes. The electric motor 78 is rigidly mounted on, and is carried by mounting or support elements 80 that are rigidly attached, welded, to the side plate 19 of the blower housing B.

The drive shaft of the electric motor 78 has a second sprocket wheel, or V-belt pulley 81 rigidly mounted thereon, and a drive chain or V-belt 82 passes therearound and engages the sprocket wheel or V-belt pulley 81 and also passes around and engages another sprocket wheel or V-belt pulley 83 that is rigidly mounted on a fan shaft 84 that is revolvably carried in a bearing that is carried at the center portion of the blower housing side plate 19. A blower rotor having fan blades 85 is rigidly carried on the revolvable fan shaft 84 and is revolvable within the blower housing 18—19—20 to move material through the discharge tube 21 as will later be described.

The machine is provided with an auger assembly which consists of an auger tube 86 having turns 87 of an auger flight rigidly fixed thereon. The auger tube 86 is revolvably supported at one end by a bearing element 88 that is carried on the side wall 18 of the blower housing B and the other end of the auger tube 86 is revolvably carried in a bearing 89 that is rigidly carried in the lower end of the vertical frame element 37. The inner end of the auger tube 86 has a sprocket wheel or a V-belt pulley 90 rigidly mounted thereon and around which a chain or V-belt 91 passes and engages for purposes of driving the auger 86—87. The chain or V-belt 91 also passes around and engages a sprocket wheel or V-belt pulley 92 that is rigidly mounted on the jack shaft 73 as the drive for the shaft 56.

The blower housing wall 18 has an opening 93 through which the discharge from the auger screw 87 may be fed into the blower housing 18—19—20 to be discharged therefrom through the discharge tube 21 by the blower fan 85.

The machine is provided with a shoe 94 that is positioned along the advancing side of the auger 87 as the machine travels around the silo, and the shoe is supported by curved shoe frame elements 95 that are suspended from, and are attached to an angle iron frame element 96. One end of the angle iron frame element 96 is supported on the outer end of a support element 97, the inner end of which is rigidly attached to the vertical support element 37. The other end of the angle iron 96 is similarly supported on the side 18 of the blower B or 18—19—20 the other end of which is rigidly attached to the blower wall 18 and holds the adjacent end of the auger shoe 94 along the outside edge of the opening 93 in the wall 18 of the blower B. At the lower corners of the shoe 94 are support elements such as shown at 99, one end of which is connected to the end shoe frames 95 and the other ends being connected to the vertical frame member 37 and the other to the side plate 18 of the blower B, and the bottom edge 94a of the auger shoe 94 is supported slightly above the lowermost edge of the auger flight 87 so that the auger flight 87 will engage the surface portion of the silage 16 in the silo as the machine operates.

The machine is convertible for use in picking up grain or other materials that are piled on the ground; and in converting the machine it may be necessary to further enclose the auger 87. This is done by the addition of a second auger shoe 100 supported on curved support elements 101 that have their upper ends carried by an angle iron support frame member 102, one end of which is rigidly carried on the outer end of a support element 103, the other end of which is rigidly carried by the vertical frame element 37. The other end of the angle iron frame element 102 is rigidly attached to the side plate 18 of the blower housing B. The lower ends of the curved shoe support elements 95 and 101 are joined by a curved spacer element 104 for stabilization purposes of the two auger shoes 95 and 100 and to hold them in their spaced apart position at their lower edges.

One end of the support member 24 is provided with a bracket 105 that is rigidly attached to the support element 24 by means of bolts 106 or other suitable attaching means and a thrust wheel 107 is revolvably carried between the end portions of the support element 24 and the bracket 105 on an axle element 108 that also passes through the ends of the support element 24 and the bracket 105 and is rigidly held in place by a nut 109 that is threaded thereon.

Figure 14:
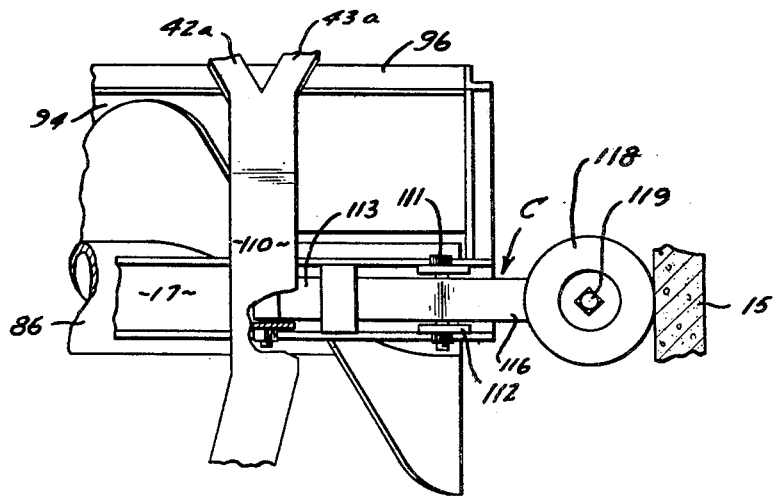
Fig. 14 is a top plan view of the elements shown in Fig. 13.

In using this machine it has been found that sometimes the surface of the silage in the silo will become cone shaped, or the center may sink so that it is lower than the outside portion next to the wall of the silo. To overcome this trouble I have provided a leveling device for the machine. This device is made as shown in Figures 13 and 14. The device consists of an independent support 110 that is in a position spaced above the outer end of the channel frame element 17 and takes the place of, and is used instead of the support elements 40 and 42. One end of the support element 110 slopes downwardly to form the supporting leg 40a that rigidly connects to the fork element 38 that carries the supporting wheel 39. The other end of the support element 110 slopes downwardly and divides into two supporting legs 42a and 43a that extend to and revolvably hold the axle element 47 the same as the support elements 42 and 43 do.

A bell-crank element C is pivotally mounted at the point 111 in a bearing element 112 therefor that is rigidly attached to the outer end of the channel frame element 17. The outer end of the bell-crank leg 113 is pivotally mounted at the point 114 in a bearing element 115 that is rigidly attached to the under side of the support element 110 to adjustably support the element 110 in elevated positions relative to the channel frame element 17. The outer end of the bell-crank leg 116 is bent to form a substantially horizontal mounting element 117 for a thrust wheel 118 that is revolvably carried on an axle pin 119 one end of which is threaded through the support element 117, and a nut 120 is threaded thereon to bear against the under side of the support element 117 to lock and hold the axle pin 119 in place. The thrust wheel will bear against the inner surface of the silo wall 15 for purposes that will later be described.

The device is provided with a curved discharge tube 121 that is long enough to reach from the blower B to and through closeable openings in the wall 15 of the silo so as to deposit the discharge from the blower B outside the silo. The under side of the discharge tube 121 is open as indicated at 122.

One end of the curved discharge tube 121 is swivelly connected with the discharge tube 21 of the blower B, and in this connection is included an electrical transmission device whereby an electric current can be fed to the electric motor 78 while the machine is in action and moving in a circular motion. This device is shown most clearly in Figures 7 and 9, although it also appears in Figures 1, 2, 4 and 10.

The discharge tube 21 of the blower B is provided with a collar element having a vertically positioned leg 123 and an outwardly extending flange portion 124 that is integrally formed thereon, and the vertically positioned collar leg 123 is rigidly attached to the upper end portion of the blower discharge tube 21 by means of rivets 124 or any other suitable fastening means.

Spaced above the collar flange 124 and snugly fitted on the discharge tube 21 of the blower B is a ring of electrical insulating material 126 that is rigidly held in place thereon by means of screws or other suitable fastening devices 127 that pass through the wall of the tube 21 and into the ring 126.

The insulation ring 126 is provided with two electrical contact rings 128 and 129 that are L-shaped in cross section and are tightly fitted, one on and around the upper outer edge, and the other on and around the lower outer edge of the insulation ring 126 as shown in Fig. 9.

One end of an insulated electric wire 130 is connected to the upper contact ring 128 and extends through a passage 131 in the insulation ring 126 and a passage 132 in the collar flange 124 and extends to and connects to the electric motor 78 for electric service thereto.

One end of a second insulated electric wire 133 is connected to the contact ring 129 and extends through a second passage 124 and extends to and connects with the electric motor 78 for electric service therefor.

The extreme upper end of the discharge tube 21 of the blower B has a second collar element thereon that consists of a vertically positioned leg element 135 that is tightly fitted on and around the blower tube 21 and is rigidly attached thereto by means of rivets 136 or any other suitable means of attachment. The collar also has an outwardly extending horizontal annular flange portion 137 that is integrally formed on and around the upper edge of the vertical collar leg 135.

One end of the stationary discharge tube 121 is provided with an annular housing element H which comprises a sleeve portion 138, an outwardly extending annular and horizontally positioned web portion 139 that is integrally formed on and around the bottom edge of the sleeve portion 138 and is revolvably supported on the outwardly extending flange portion 137 of the collar element 135—137. The housing element H is further provided with an annular skirt portion 140, the upper edge of which is integral with the outer edge portion of the web 139 and depends therefrom to cover or house the outer edges of the flange elements 124 and 137 and to be revolvable in close proximity thereto.

The skirt element 140 has a pair of electrical brush holder elements 141 and 142 passing therethrough and being held thereby and in which is held a pair of brush elements 143 and 144 that yieldably bear one against the contact ring 128 and the other against the contact ring 129. Electrical feed wires 145 and 146 connect one to the brush holder 141 and the other to the brush holder 142 for purposes of carrying an electric current through the brushes 143 and 144 to the revolving rings 128 and 129, and thence through the wires 130 and 133 to the electric motor 78 for the operation thereof.

In preparaing to use the machine the silo of course would be filled, whereupon the unloading machine would be placed on top of the silage. Due to size and weight of the machine, the machine could be lifted into the silo in sections and then assembled in the silo after all of the sections have been placed therein, or if desired the machine could be fully assembled on the ground and lifted with a suitable crane mounted on top of the silo and placed in the silo in a fully assembled condition. The machine when properly positioned in the silo will be supported on the wheels 27, 28, 39 and the tractor wheels 48 and 49 and the thrust wheels 35 and 107 will rest against the inner surface of the silo wall 15 and the auger portion of the machine is preferably long enough to reach to or past the center of the circle of the silo wall 15.

The machine having thus been placed, the discharge tube 121 is mounted on the blower discharge tube 21 with the assembly shown in Figs. 7 and 9 in place and the outer end of the discharge tube 121 being positioned outside the silo through the unloading openings existent in all standard silos.

The machine having thus been placed is ready for use. To use the machine, an electric current is fed through the wires 145 and 146 through the swivel connections and through the wires 130, 133, to the electric motor 78, whereupon the motor will run to operate the machine. The parts of the machine operated by the electric motor is first the blower 85, then the auger 86—87 and then the tractor wheels 48 and 49 which will push the outer end of the machine in the direction of the arrow T, whereupon the auger flight 87 will engage a shallow depth of the surface of the silage 16 and as the machine moves in its circular motion, the auger flight 87 will move the material engaged thereby into the space between the auger tube 86 and the auger shoe and will move the material toward and push it through the blower housing opening 93 into the blower housing B whereupon the blower or fan blades 85 together with a draft of air driven thereby will carry and blow the silage fed thereinto through the blower discharge tube 21 and into the curved discharge tube 121 with sufficient force that the silage material will be discharged from the outer end of the tube 121 outside the silo. When the machine is stopped, the material in the discharge tube 121 will fall therefrom through the open bottom side 122 of the tube 121 and will therefore not clog up the machine and prevent it from working the next time the machine is started.

The machine in working travels around and around in the silo, and as the machine travels the thrust wheels 35 and 107 engage the inner surface of the silo wall 15 and serve to always station the auger 86—87 substantially as the radius or diameter line of the circle of the silo wall 15.

As the machine runs the cross arms 67 and 68 are revolved with considerable speed and the lugs 69 carried thereby will engage and knock down the silage next to the wall 15 that was not caught by the auger and that silage will be picked up by the auger on the next trip around.

Sometimes the machine while working will remove layers of silage that are thicker at the edge than at the center of the silo or vice versa and if this is permitted to continue the surface of the silage will take on a cone shape or else will be sunk in the center, either of which would be detrimental to the operation of the machine, therefore in order to avoid or overcome this trouble the leveling mechanism shown in Figs. 13 and 14 may be employed, and the operation of this device is that the thrust wheel 119 rolls against the inner surface of the silo wall 15 and as the surface of the silage begins to get out of level the auger 86—87 and the channel frame member 17 will want to drop or raise to the angle developed at the top of the silage in the silo, and as the frame member 17 changes from its level position, the thrust wheel 119 will maintain the position of the bell crank 113—116 which, by reason of being connected by the support element 110 that is supported by the wheels 39, 48 and 49 will, in effect raise or lower the outer end of the channel frame element 17 to maintain the channel frame element 17 in substantially a level position, the result is that the cuts taken from the top of the silage will always leave the top of the silage level and insure perfect working of the machine.

It is the intention to build the machine in one, or not more than two or three standard sizes that will take care of most all sizes of silos. However, if the machine should be placed in a silo where the auger portion of the machine is not long enough to reach to the center of the silo but the blower housing B would set over the center of the silo, the blower housing plate 22 on the bottom thereof could be reversed and the silage at the center of the silo would project through the opening left by the plate 22 and be caught by the ends of the fan or blower blades 85 and be moved into the stream of silage being fed by the auger through the opening 93 and into the blower housing B and the machine is thereby adapted for use in silos having a larger radius than the machine was originally built for or intended to be used in.

While the machine is built for use almost exclusively for unloading silos, the machine could be set on the ground and be moved into a pile of wheat and be used to move the wheat into a truck or wagon box, or the machine could be used to move other materials that are movable by the machine from one place to another.

While the machine as shown and described is probably the preferred form of the machine, it is to be understood that such modifications of the machine may be employed as lie within the scope of the appended claims without departing from the spirit and intention of the invention. Now having fully described and shown my invention, what I claim is:

1. In a device for unloading a silo having a curved under surface wall; said device having an elongated frame and cross members attached to the frame to form a T-shaped frame structure, the outer end portions of the cross frame members having supporting wheels carried thereby, one of the said outer ends of the cross frame members having a horizontally carried wheel thereon for engagement with the curved wall of the silo, the outer end of the elongated frame being supported on a pair of tandem wheels, one of said pair of tandem wheels being a traction wheel, said pair of tandem wheels being adjustable relative to each other to travel a curve similar to the curve of the silo wall, an auger cutting and gathering element and a suction element, said auger being revolvably carried in the elongated frame and being engageable with silage material in the silo and on which the device is movably supported, a power unit, said power unit being carried by the elongated frame, said suction element being carried by the said frame structure at one end of the auger and in position thereto to receive silage material delivered thereto by the auger, said suction element having a vertically curved open bottom discharge tube, one end of which is swivelly attached to the discharge member of the suction element, the other end of the open bottom discharge tube being positionable outside the curved wall of the silo, said power unit being connected with the rotatable part of the suction element and the said traction wheel for power driving the suction element to move silage material entered thereinto and to drive the device in a curved line of travel in the silo comparable to the curve of the silo wall, said auger being long enough to reach from the center axis of the silo to a point immediately adjacent the wall of the silo, and revolvable thrust means carried by the outer end of the elongated frame and being engageable with the curved inner surface of the silo wall as a gauge to prevent the auger and frame supporting members from engaging the silo wall.

2. In a device for unloading a silo having a curved inner surface wall; the elements, structure, arrangement and association thereof as defined in claim 1, said elongated frame having power driven means on the outer end thereof for scouring the inner surface of the silo wall as the outer end of the device moves thereby.

3. In a device for unloading a silo having a curved inner surface wall; the elements, structure, arrangement and association thereof as defined in claim 1, a shoe, said shoe being carried by the said elongated frame element and being in close proximity to the auger to assist the auger in its conveying action.

WILLIAM W. McLEAN.

References Cited in the file of this patent

UNITED STATES PATENTS

| Number | Name | Date |
| --- | --- | --- |
| 1,275,558 | Holmgreen | Aug. 13, 1918 |
| 1,550,311 | Foster | Aug. 18, 1925 |
| 2,500,043 | Radtke | Mar. 7, 1950 |
| 2,595,333 | Clapp | May 6, 1952 |